A. P. ANDERSON.
ART OF TREATING STARCH MATERIALS, FLOURS, AND FLOUR PRODUCT.
APPLICATION FILED AUG. 31, 1906.
1,035,830.
Patented Aug. 20, 1912.
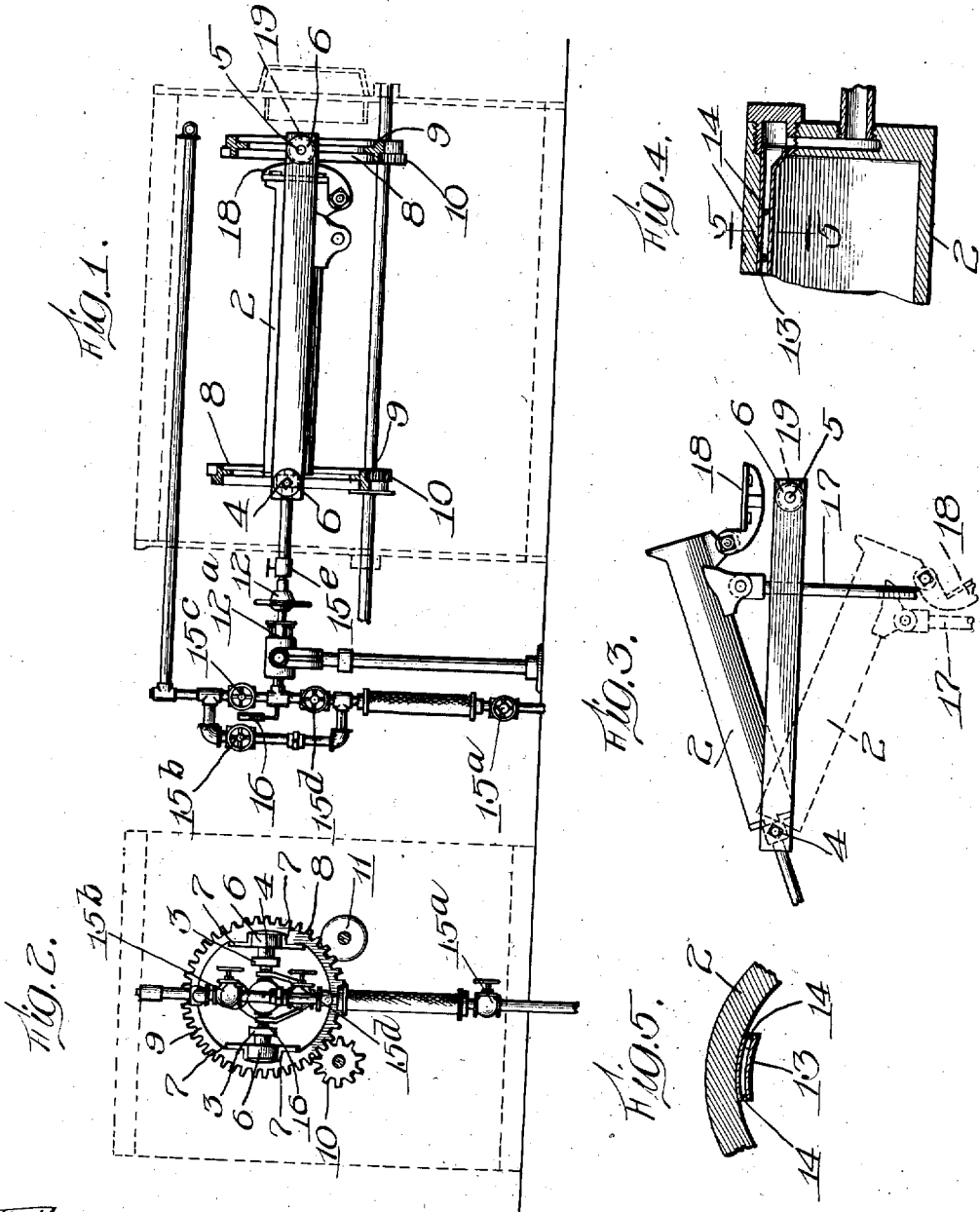

UNITED STATES PATENT OFFICE.

ALEXANDER P. ANDERSON, OF CHICAGO, ILLINOIS.

ART OF TREATING STARCH MATERIALS, FLOURS, AND FLOUR PRODUCT.

1,035,830.   Specification of Letters Patent.   Patented Aug. 20, 1912.

Application filed August 31, 1906. Serial No. 332,806.

*To all whom it may concern:*

Be it known that I, ALEXANDER P. ANDERSON, a citizen of the United States, residing at Chicago, in the county of Cook and State of Illinois, have invented new and useful Improvements in Art of Treating Starch Materials, Flours, and Flour Products, of which the following is a full, clear, concise, and exact description, reference being had to the accompanying drawing, forming a part of this specification.

My invention relates to a new process of treating starch-containing flours, and to a new product made from such materials.

This application relates to a species of the generic invention set forth in my application filed contemporaneously herewith, Serial No. 332,804.

The object of my invention is to provide a new process of treating flours made from cereal grains or other flours containing sufficient starch (such, for example as that made from the banana), to thereby produce a pebbled or nodular product, that is, a product consisting preferably wholly of small lumps resembling pebbles or nodules, which may be used as a cereal-food product, or for other purposes. Also, to provide a new pebbled or nodular flour product made from the materials above mentioned, and having new and valuable characteristics.

In carrying out the process, I may use the apparatus shown in the accompanying drawing or that of my co-pending application Serial No. 329,030, filed August 3, 1906, or that of my application Ser. No. 397,324, filed Oct. 14, 1907.

In these drawings: Figure 1 is a side view of the piping together with a longitudinal sectional elevation of the drum-support in the oven, the latter being indicated in dotted lines; Fig. 2 is a rear end view of the oven; Fig. 3 shows the drum in charging and discharging positions, the latter position being indicated in dotted lines; Fig. 4 is a sectional view of the rear end of the drum; and, Fig. 5 is a section of the drum on the line 5—5 of Fig. 4.

The raw material to be treated is put into a drum 2, mounted upon a suitable car capable of being rolled about and brought to the various parts of the apparatus for handling. The car consists of two side members 3, 3, having a trunnion 4 extending therebetween at the rear end; a shaft or axle 5 connects the forward ends of said members. Small wheels or rollers 6 are mounted outside of the members 3, upon the projecting ends of trunnion 4 and shaft 5. The cars run on a track 7 within the oven, consisting of four rails fastened to the inside of the cage 8. At each end of the oven is a ring 9 having teeth outside forming a gear, which meshes with another gear 10 adapted to rotate the cage. The gears 10 and rollers 11 support the cage and inclosed drum, in addition to causing rotation thereof by any suitable power applied to one of their supporting shafts outside of the oven.

After the drum has been run into the oven, a steam-connection is made at 12, thus admitting steam to the flattened pipe 13 inside of the drum. The steam escapes into the drum through numerous holes 14 in the pipe, said holes becoming more frequent in proportion to the drop in pressure as the steam advances.

By means of the gears 9 and 10 the cage containing the drum is rotated slowly during the heating. Rotation is permitted by the stuffing box $12^a$ which at the same time maintains the steam-connection. The arrangement of the piping shown is as follows: $15^a$, $15^b$, $15^c$, $15^d$ and $15^e$ are valves; 16 is a pressure gage. By opening valves $15^b$, $15^a$, and closing valves $15^d$ and $15^c$, the steam is by-passed around the drum. By closing the valve $15^b$ and opening $15^c$, the pressure in the drum may be brought to any desired point as shown by gage 16. To reduce the pressure in the drum, valve $15^c$ may be closed and valves $15^d$ and $15^a$ opened, whereby the pressure escapes into the atmosphere. Thus, by proper valve-manipulation, the conditions of pressure and temperature in the drum may be regulated and controlled absolutely within the desired limits. It will be understood that the oven is heated by any suitable or desired means,—as, for example, by gas.

The lid 18 of the drum is clamped tightly closed, a suitable soft-metal gasket being provided to cause an air-tight connection, when the drum is in the horizontal position in its frame. In order that the heating may not unseal the lid, I prefer to make the drum of bronze, or some material having a higher coefficient of expansion than the side members of the frame.

To remove the drum from the oven after the heating, valve $15^e$ is closed, the drum is disconnected at 12, and is run out of the oven to a raising and lowering mechanism suitably connected with the drum through the arm 17. By means of this mechanism the drum is lowered about the shaft 4 as a pivot, as indicated in dotted lines in Fig. 3. The lid 18, previously held shut by the roller 19, suddenly flies open from internal pressure, if pressure there be, when the contents are discharged, assisted by gravity. In charging, the drum is raised by the same arm or screw 17 until it tilts upwardly, and the material to be treated may be fed into the drum.

By means of the apparatus just described, which is preferred for commercial purposes, it is convenient and practicable to subject the material in the drum or cylinder to any degree of heat or pressure, and if desired, to moisture as well as to the desired agitation or tumbling action.

The flour used in the process of my present invention and in the product may be in the ordinary condition, although it need not be bolted or very fine; the ordinary flour not bolted may be used. Preferably it should not be too coarse or too granular, although a very finely ground flour or one that has been bolted ordinarily results in a product having a more homogeneous or uniform structure. The material, however, should contain sufficient starch and moisture to render the same sticky when heated to such an extent that the starch becomes gelatinized to a greater or less degree, to thereby form nuclei or centers when it is agitated by the rotation of the receptacle in which it is heated. This tumbling action causes the sticky nuclei or centers to roll or gather up the powdered material, thereby forming lumps which resemble water-worn pebbles, the process being preferably continued until all of the material is so gathered up into pebble-like lumps or balls; although it will be apparent that by stopping the process before completion, fine powder may be present with the lumps, and also that by continuing the process a longer time than merely sufficient to gather up the powder, a harder or glazed surface may be imparted thereto.

In order that one specific manner of performing the process may be fully set forth to enable others to practice the invention, I shall describe specifically the preferred process of treating wheat flour in accordance with my invention, it being understood that various changes and alterations may be made in the same without departing from the spirit or scope of the invention. In this preferred process, the wheat flour has added to it sufficient water to bring the total moisture up to about 20 to 30%. The moisture is added in any convenient way,—for example, by spraying while the flour is being stirred, or by allowing steam from a jet to pass through it slowly, in which case the flour absorbs the water of the steam in sufficient amount which may be determined by weighing. An even distribution of the moisture throughout the material, so as not to leave large wet masses, should be made, although it may not be absolutely even in its distribution throughout the whole mass. Enough of this flour is now put into the drum, if the apparatus shown in the drawings be employed, to fill it from one-half to three-fourths full, after which the drum is sealed air tight by closing the lid. The drum is heated from any suitable source, as by the oven indicated in the drawings, the temperature to which the drum is raised varying from 150° to 250° C. During the heating the drum is kept in rotation. In this treatment, the flour soon becomes heated to a temperature at which it begins to give off its moisture in the form of steam, which fills the space in the drum not occupied by the flour, and under the conditions is, of course, hotter than the flour. The result is a condensation on and throughout the flour. At a temperature of about 70° to 80° C., the starch begins to become sticky on account of incipient gelatinization, although it is not likely that all of the starch in the flour becomes sticky at the same time. But the granules that gelatinize coalesce and form centers or nuclei which, in tumbling, gather up other granules and ingredients composing the flour, thereby increasing their size by these accretions. It is also probable that such nuclei or centers, in their tumbling or rolling, do not all grow at the same speed, and therefore that during this action the balls or pebbles do not always grow in size the same amount or evenly throughout their whole surface. For this reason, when all of the powder has been gathered up, the lumps may vary somewhat in size as well as form. Also, due to their method of growth and to the tumbling action, the surfaces of these pebbles become smooth and worn, thus causing them to resemble water-worn pebbles, from which fact they are termed nodular or pebble-like, the latter terminology being preferred and the product when wheat flour is thus treated may be termed "pebbled-wheat." I have found that when flour containing the smaller percentage of moisture, say 20%, is treated, the pebbles are larger than when the larger percentage of moisture, say 30%, is present. I would explain this by the fact that with the drier flour, fewer nuclei or centers form than with the more moist flour, it being understood that the fewer the centers formed, the larger the pebbles, and vice versa, since in either case, if the process be continued for a sufficient time, the centers continue their growth until all of the powder has been gathered up.

When the temperature of the flour and starting lumps or pebbles reaches about 100° C., the gage begins to show a pressure within the drum, which increases with the increasing temperature of the material. So that at the end of about an hour when the oven temperature is about 250° C., or at the end of about two hours when the oven is about 150° C., a pressure of about 15 to 40 pounds develops. It is apparent that the time of treatment may vary with the amount of material contained in the drum as well as with the size of the drum employed. The pressure needed for the pebbling varies with the amount of moisture contained in the material. Thus, with the apparatus shown, and when the flour used contains say about 30% of moisture, about 15 pounds per square inch is sufficient for its complete pebbling. When it contains a smaller percentage of moisture, say 20%, a pressure of about 40 pounds per square inch is needed. When all or as much of the flour as is desired has pebbled, and the pebbles formed are of sufficient hardness, especially on their peripheries to prevent them crumbling or powdering, the pebbling operation is brought to a completion by slowly reducing the pressure within the drum,—as by blowing off slowly, this being readily accomplished by opening the blow-off valve partly at first and then widely, until the pressure falls to zero, whereupon the cylinder may be opened, and the pebbled flour taken out. Should the pebbles now contain more moisture than they would in an air-dry condition, the excess may be removed, by kiln-drying, or, by any other approved method,—as, for example, drying in the sun.

In the steps of the preferred process above described, I use pressures as stated, since I find the best results to be thus accomplished. However, flour may be pebbled at a slight pressure or tension of the steam surrounding the flour by leaving the blow-off valve open during the time of treatment in the drum. Thus, by taking flour containing the larger percentage of moisture given above, and subjecting the cylinder or drum to the higher oven temperature given, the pebbling operation can be successfully carried out.

Instead of using wheat flour, as above described, I may take oat flour containing about 25 to 40% of moisture and by subjecting it to substantially the same treatment, I can produce pebbled oats, in which the pebbles resemble, in form and size, pebbled wheat. Or, I may take the flour known in commerce as conquintay or banana meal, which is made in large quantities in the West Indies and in Guiana from unripe bananas by first peeling them, then drying the starchy mass in the sun, and then, when dry, pulverizing or grinding the mass into meal, which contains a large percentage of starch together with the fiber and other constituents of the fruit. This meal or flour is taken and a sufficient amount of water added to it to bring its total moisture up to about 20 to 40%, and is then subjected to the above pebbling treatment, which results in a product which may be called pebbled banana or pebbled banana flour.

The pebbled products, which are preferably made as above described, vary in their hardness somewhat according to the amount of moisture in the flour, the temperature of the oven, the pressure within the drum, as well as the time given to the operation. The pebbles are also sufficiently hard and compact to prevent them from powdering or crumbling when handled, as in being poured from one receptacle to another. In fact, that may be handled in substantially the same way as grain or seeds, without powdering.

The pebbled flours have a variety of uses. For instance, when sufficiently cooked during the treatment, they may be used as food without further preparation, or they may be used for other purposes in the art. Also they may be further treated for puffing or swelling according to my process which forms the subject-matter of my co-pending application Serial No. 370,004, filed April 24, 1907, to produce the novel product claimed in my co-pending application Serial No. 116,279, filed July 19, 1902.

Having thus described the invention and the preferred manner of carrying the same into effect, what I claim and desire to secure by Letters Patent, is:

1. The herein disclosed process which consists in heating moistened starch-containing flour to a temperature sufficient with the moisture present to produce some gelatinization of the starch in the material, and subjecting the material to a tumbling action which is continued until the same is formed into pebbles.

2. The process of pebbling starch-containing flours which consists in heating such flour having a moisture content above air-dry to a temperature sufficient to create from the starch in such material sticky nuclei or centers, and subjecting the mass to a tumbling action, whereby, as the tumbling action is continued, the nuclei or centers are caused to gather up the loose flour into pebble-like lumps.

3. The herein disclosed process which consists in heating starch-containing flour having about 20 to 40 per cent. moisture to a temperature sufficient to gelatinize some of the starch granules in the flour, which gelatinized granules form centers or nuclei, and conjointly subjecting the mass to a tumbling action, whereby the said nuclei or centers are caused to gather up the loose flour and grow in size by accretion to form lumps.

4. The herein disclosed process which consists in heating starch-containing flour having about 20 to 40 per cent. moisture in a closed receptacle, meanwhile tumbling the same, to a temperature sufficient to develop a steam atmosphere within the receptacle, whereby the starch in the flour is converted into sticky centers or nuclei, and continuing the heating and tumbling until substantially all of the loose material is gathered up by the gelatinized centers or nuclei into pebble-like lumps.

5. The process of pebbling starch-containing flours which consists in heating and tumbling the material containing about 20 to 40 per cent. moisture in a closed receptacle until sticky nuclei or centers are formed, then continuing the heating and tumbling until a pressure of about 15 to 40 pounds per square inch has developed within the receptacle and the nuclei or centers have gathered up substantially all of the loose material into pebble-like lumps, and then slowly reducing the pressure.

6. The process of pebbling starch-containing flours which consists in heating and tumbling the material containing about 20 to 40 per cent. moisture in a closed receptacle until sticky nuclei or centers are formed, then continuing the heating and tumbling until a pressure of about 15 to 40 pounds per square inch has developed within the receptacle, whereby the nuclei or centers gather up substantially all of the loose material into pebble-like lumps, then slowly reducing the pressure, and then drying the product to a substantially air-dry condition.

7. As an article of manufacture, a starch-containing flour-product pebble-like in shape, having a worn, hardened periphery, and formed by accretion.

8. As an article of manufacture, a starch-containing flour-product pebble-like in shape, having a worn hardened periphery.

In witness whereof, I have hereunto subscribed my name in the presence of two witnesses.

ALEXANDER P. ANDERSON.

Witnesses:
J. JAY SMITH,
JAMES RIDEOUT.

---

Corrections in Letters Patent No. 1,035,830.

It is hereby certified that in Letters Patent No. 1,035,830, granted August 20, 1912, upon the application of Alexander P. Anderson, of Chicago, Illinois, for an improvement in "The Art of Treating Starch Materials, Flours, and Flour Product," errors appear in the printed specification requiring correction as follows: Page 1, line 43, for the word "oven" read *arrangement shown in Fig. 1;* page 2, line 10, for the word "and" read *when;* page 3, line 27, strike out the word "slowly"; and that the said Letters Patent should be read with these corrections therein that the same may conform to the record of the case in the Patent Office.

Signed and sealed this 29th day of October, A. D., 1912.

[SEAL.]

C. C. BILLINGS,
*Acting Commissioner of Patents.* ing about 20 to 40 per cent. moisture in a closed receptacle, meanwhile tumbling the same, to a temperature sufficient to develop a steam atmosphere within the receptacle, whereby the starch in the flour is converted into sticky centers or nuclei, and continuing the heating and tumbling until substantially all of the loose material is gathered up by the gelatinized centers or nuclei into pebble-like lumps.

5. The process of pebbling starch-containing flours which consists in heating and tumbling the material containing about 20 to 40 per cent. moisture in a closed receptacle until sticky nuclei or centers are formed, then continuing the heating and tumbling until a pressure of about 15 to 40 pounds per square inch has developed within the receptacle and the nuclei or centers have gathered up substantially all of the loose material into pebble-like lumps, and then slowly reducing the pressure.

6. The process of pebbling starch-containing flours which consists in heating and tumbling the material containing about 20 to 40 per cent. moisture in a closed receptacle until sticky nuclei or centers are formed, then continuing the heating and tumbling until a pressure of about 15 to 40 pounds per square inch has developed within the receptacle, whereby the nuclei or centers gather up substantially all of the loose material into pebble-like lumps, then slowly reducing the pressure, and then drying the product to a substantially air-dry condition.

7. As an article of manufacture, a starch-containing flour-product pebble-like in shape, having a worn, hardened periphery, and formed by accretion.

8. As an article of manufacture, a starch-containing flour-product pebble-like in shape, having a worn hardened periphery.

In witness whereof, I have hereunto subscribed my name in the presence of two witnesses.

ALEXANDER P. ANDERSON.

Witnesses:
J. JAY SMITH,
JAMES RIDEOUT.

---

Corrections in Letters Patent No. 1,035,830.

It is hereby certified that in Letters Patent No. 1,035,830, granted August 20, 1912, upon the application of Alexander P. Anderson, of Chicago, Illinois, for an improvement in "The Art of Treating Starch Materials, Flours, and Flour Product," errors appear in the printed specification requiring correction as follows: Page 1, line 43, for the word "oven" read *arrangement shown in Fig. 1;* page 2, line 10, for the word "and" read *when;* page 3, line 27, strike out the word "slowly"; and that the said Letters Patent should be read with these corrections therein that the same may conform to the record of the case in the Patent Office.

Signed and sealed this 29th day of October, A. D., 1912.

[SEAL.]

C. C. BILLINGS,
*Acting Commissioner of Patents.*

It is hereby certified that in Letters Patent No. 1,035,830, granted August 20, 1912, upon the application of Alexander P. Anderson, of Chicago, Illinois, for an improvement in "The Art of Treating Starch Materials, Flours, and Flour Product," errors appear in the printed specification requiring correction as follows: Page 1, line 43, for the word "oven" read *arrangement shown in Fig. 1;* page 2, line 10, for the word "and" read *when;* page 3, line 27, strike out the word "slowly"; and that the said Letters Patent should be read with these corrections therein that the same may conform to the record of the case in the Patent Office.

Signed and sealed this 29th day of October, A. D., 1912.

[SEAL.]

C. C. BILLINGS,

*Acting Commissioner of Patents.*